United States Patent
Bertram et al.

(10) Patent No.: US 9,405,515 B1
(45) Date of Patent: Aug. 2, 2016

(54) COMPUTING SYSTEMS UTILIZING CONTROLLED DYNAMIC LIBRARIES AND ISOLATED EXECUTION SPACES

(71) Applicant: Rockwell Collins, Inc., Cedar Rapids, IA (US)

(72) Inventors: Joshua R. Bertram, Ames, IA (US); Jason A. Myren, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/613,804

(22) Filed: Feb. 4, 2015

(51) Int. Cl.
*G06F 9/45* (2006.01)
*G06F 9/54* (2006.01)

(52) U.S. Cl.
CPC .. *G06F 8/41* (2013.01); *G06F 9/54* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 5,802,367 | A * | 9/1998 | Held | G06F 9/445 719/332 |
| 6,292,874 | B1 * | 9/2001 | Barnett | 711/153 |
| 6,507,904 | B1 * | 1/2003 | Ellison et al. | 712/229 |
| 6,802,065 | B1 * | 10/2004 | Riedmann | 719/312 |
| 7,013,484 | B1 * | 3/2006 | Ellison et al. | 726/26 |
| 7,082,615 | B1 * | 7/2006 | Ellison et al. | 726/26 |
| 7,089,418 | B1 * | 8/2006 | Ellison et al. | 713/166 |
| 8,082,556 | B1 * | 12/2011 | Aiouaz | G06F 9/541 340/1.1 |
| 9,063,800 | B2 * | 6/2015 | McCready | |
| 2002/0144010 | A1 * | 10/2002 | Younis | G06F 9/546 719/314 |
| 2002/0144121 | A1 * | 10/2002 | Ellison et al. | 713/176 |
| 2003/0152077 | A1 * | 8/2003 | Saint Etienne et al. | 370/389 |
| 2004/0078590 | A1 * | 4/2004 | Ellison et al. | 713/200 |
| 2005/0197750 | A1 * | 9/2005 | MacDougall | 701/3 |
| 2006/0041776 | A1 * | 2/2006 | Agrawal et al. | 714/2 |
| 2006/0136511 | A1 * | 6/2006 | Ngo et al. | 707/203 |
| 2007/0261044 | A1 * | 11/2007 | Clark | 717/162 |
| 2008/0001711 | A1 * | 1/2008 | Agarwal | H04W 4/02 340/10.1 |
| 2008/0091300 | A1 * | 4/2008 | Fletcher et al. | 700/245 |
| 2008/0244564 | A1 * | 10/2008 | Sonkin | G06F 8/61 717/175 |
| 2010/0292979 | A1 * | 11/2010 | Minot | 703/21 |
| 2011/0066763 | A1 * | 3/2011 | Minot | 710/12 |
| 2011/0296151 | A1 * | 12/2011 | Martinez | 713/1 |
| 2011/0296379 | A1 * | 12/2011 | McCready | 717/121 |
| 2011/0314554 | A1 * | 12/2011 | Woods | 726/27 |
| 2012/0210085 | A1 * | 8/2012 | Weich | G06F 21/74 711/163 |
| 2012/0240108 | A1 * | 9/2012 | Baraldi | G06F 8/62 717/176 |
| 2012/0246522 | A1 * | 9/2012 | Frayssignes | 714/48 |
| 2012/0259955 | A1 * | 10/2012 | Darr | G06F 13/385 709/219 |
| 2013/0138271 | A1 * | 5/2013 | Danielsson et al. | 701/3 |
| 2013/0159477 | A1 * | 6/2013 | Danielsson et al. | 709/220 |
| 2013/0247025 | A1 * | 9/2013 | Barberet et al. | 717/173 |
| 2013/0275940 | A1 * | 10/2013 | Park et al. | 717/105 |
| 2014/0026149 | A1 * | 1/2014 | Backensto et al. | 718/107 |
| 2014/0137085 | A1 * | 5/2014 | Rayole | 717/139 |
| 2015/0026658 | A1 * | 1/2015 | Jones | 717/108 |

* cited by examiner

*Primary Examiner* — Matthew Brophy
(74) *Attorney, Agent, or Firm* — Angel N. Gerdzhikov; Donna P. Suchy; Daniel M. Barbieri

(57) ABSTRACT

Systems and methods for providing dynamic libraries in safety critical computing environments are disclosed. Controlled dynamic libraries and isolated execution spaces are utilized. In some embodiments, the controlled dynamic libraries and isolated execution spaces are implemented in full compliance with rules and standards established by aviation regulatory and government agencies, allowing systems utilizing the controlled dynamic libraries to be certifiable for avionics.

19 Claims, 12 Drawing Sheets

COMPUTING SYSTEMS UTILIZING CONTROLLED DYNAMIC LIBRARIES AND ISOLATED EXECUTION SPACES

BACKGROUND

Aviation electronics, also known as avionics, may refer to the electronic systems used on aircraft, satellites, spacecrafts, and various other types of aerial vehicles.

SUMMARY

Embodiments of the inventive concepts disclosed herein are directed to a method. The method may include: loading a plurality of binary files into a plurality of isolated execution spaces defined on a computing system; establishing controlled interfaces between at least two of the plurality of isolated execution spaces according to configurations specified in a configuration file; and forming an executable application for execution on the computing system, the application being formed based on the plurality of isolated execution spaces and the controlled interfaces established therein.

In one aspect, the inventive concepts disclosed herein are directed to a method including: compiling a plurality of source files to produce a plurality of compiled files; loading the plurality of compiled files into a plurality of isolated execution spaces defined on a computing system; establishing controlled interfaces between at least two of the plurality of isolated execution spaces according to configurations specified in a configuration file; and forming an executable application for execution on the computing system, the application being formed based on the plurality of isolated execution spaces and the controlled interfaces established therein.

A further embodiment of the present disclosure is directed to a system. The system may include a memory, a memory management unit configure to mange allocation of the memory, and a processor. The processor may be configured to: provide a plurality of isolated execution spaces defined according to an operating system executing on the processor; load a plurality of binary files into the plurality of isolated execution spaces, wherein each one of the plurality of binary files is loaded into a corresponding one of the plurality of isolated execution spaces, wherein each one of the plurality of isolated execution spaces is provided full memory access to an allocated memory portion, and wherein the memory management unit is utilized to prevent a particular isolated execution space of the plurality of isolated execution spaces from accessing the allocated memory portion of another isolated execution space of the plurality of isolated execution spaces; establish controlled interfaces among the plurality of isolated execution spaces according to configurations specified in a configuration file, wherein communications between the plurality of isolated execution spaces are permissible only through the controlled interfaces established among the plurality of isolated execution spaces; and form an executable application for execution on the computer system, the application being formed based on the plurality of isolated execution spaces and the controlled interfaces established therein.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Figure 1:
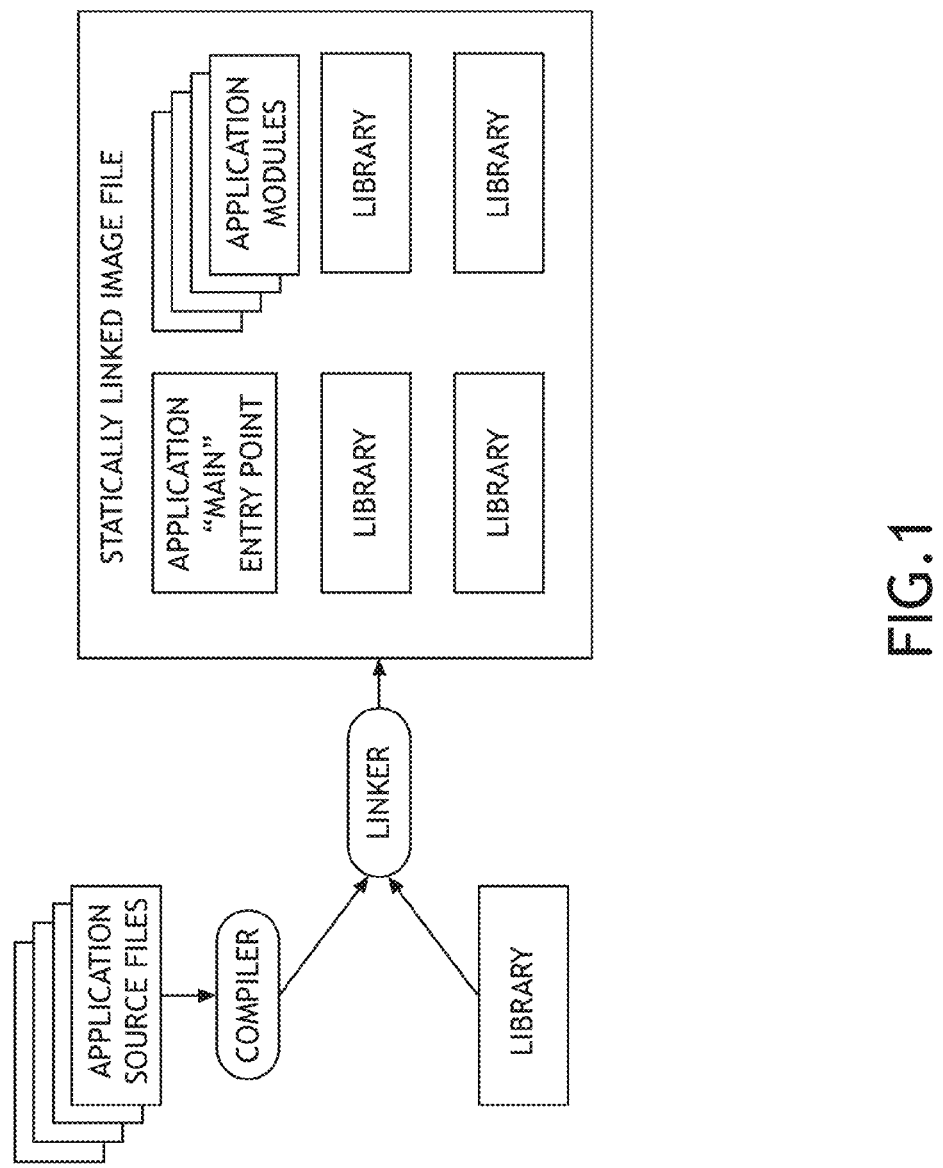
FIG. 1 is an illustration depicting an application compiled with statically linked libraries.

Due to concerns about safety, determinism, regulations and other considerations, avionics often do not utilize techniques or features available in commercially available counterparts. An example of this is the use of shared libraries or dynamic libraries, which are commonly used in commercially available applications. In avionics, however, applications are typically linked statically with all the required libraries, as illustrated in FIG. 1. This is done out of a desire to clearly identify what constitutes an application, and eliminates all ambiguity as to what the state of the application will be when it is loaded on a target environment.

Figure 2:
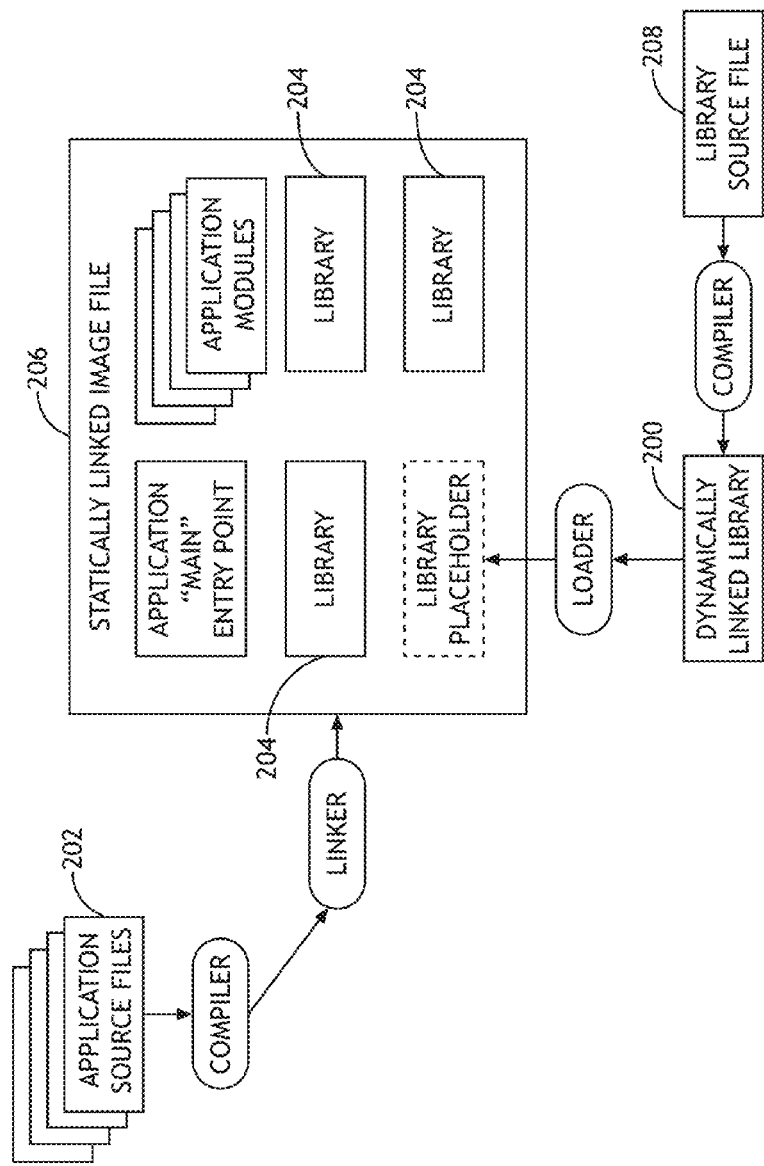
FIG. 2 is an illustration depicting an application compiled with at least one dynamically linked library.

In contrast, most commercially available operating systems support some form of dynamically linked libraries. As illustrated in FIG. 2, a dynamically linked library 200 is not linked with an executable application 206 at compile time like statically linked libraries 204. Instead, an application source file 202 may be compiled and linked to form the executable application 206 without the dynamically linked library 200 (which may be compiled from library source file(s) 208 separately from the application source file 202). The executable application 206 and the dynamically linked library 200 may then be linked at runtime when the application is loaded by the operating system.

It is noted that dynamically linked libraries may provide several advantages over static libraries. For instance, if multiple applications use the same library, only one instance of the library needs to be loaded, therefore providing space savings. In addition, if an updated version is available for a dynamically linked library, the dynamically linked library may be updated on the target environment without changing the application itself. Furthermore, dynamically linked libraries may be able to insulate an application from underlying operating system or platform differences, making the application more portable.

It is also noted, however, that existing implementations of dynamically linked libraries are also associated with various problems. For instance, version control may be difficult to implement, and an application may be negatively impacted by an intentional or unintentional change in a dynamically linked library. The various problems associated with existing implementations of dynamically linked libraries introduce uncertainties, which can be difficult or impossible to predict.

While various techniques have been developed to mitigate some of the problems associated with dynamically linked libraries, they are generally focused on ease of maintenance and occasional mishaps still happen. While occasional mishaps may be considered acceptable for some systems, it is to be understood that they may lead to serious safety impacts on an avionic system, where safety is of paramount importance. Consequently, existing implementations of dynamically linked libraries in commercially available operating systems cannot be utilized for safety critical avionics.

Embodiments of the inventive concepts disclosed herein provide computing systems for avionics that take advantages of dynamic libraries while ensuring system safety. More specifically, controlled dynamic libraries and isolated execution spaces are utilized to address the aforementioned problems associated with existing implementations of dynamically linked libraries. In some embodiments, the controlled dynamic libraries and isolated execution spaces are implemented in full compliance with rules and standards established by aviation regulatory and government agencies, allowing systems utilizing the controlled dynamic libraries in accordance with the inventive concepts disclosed herein to be certifiable for avionics.

It is contemplated that utilizing controlled dynamic libraries and isolated execution spaces in accordance with embodiments of the inventive concepts disclosed herein provides several advantages over static libraries currently used in avionics. When static libraries are used, a change to either an application or one of its libraries may potentially impact all the code that is linked into the final application and drives a number of re-verification/certification efforts and costs. For instance, when an application binary is re-linked, the contents of the complied application executable (e.g., the application binary) are invariably different. This requires various analyses to be repeated, including, for example, link map analysis, stack analysis, data and control coupling analysis, object code analysis, memory usage analysis, timing margin analysis, as well as updates to related artifacts including reviews, audits, and resubmissions. Utilizing controlled dynamic libraries and isolated execution spaces in accordance with embodiments of the inventive concepts disclosed herein helps reducing some of the re-verification/certification efforts and costs without compromising system safety.

Figure 3:
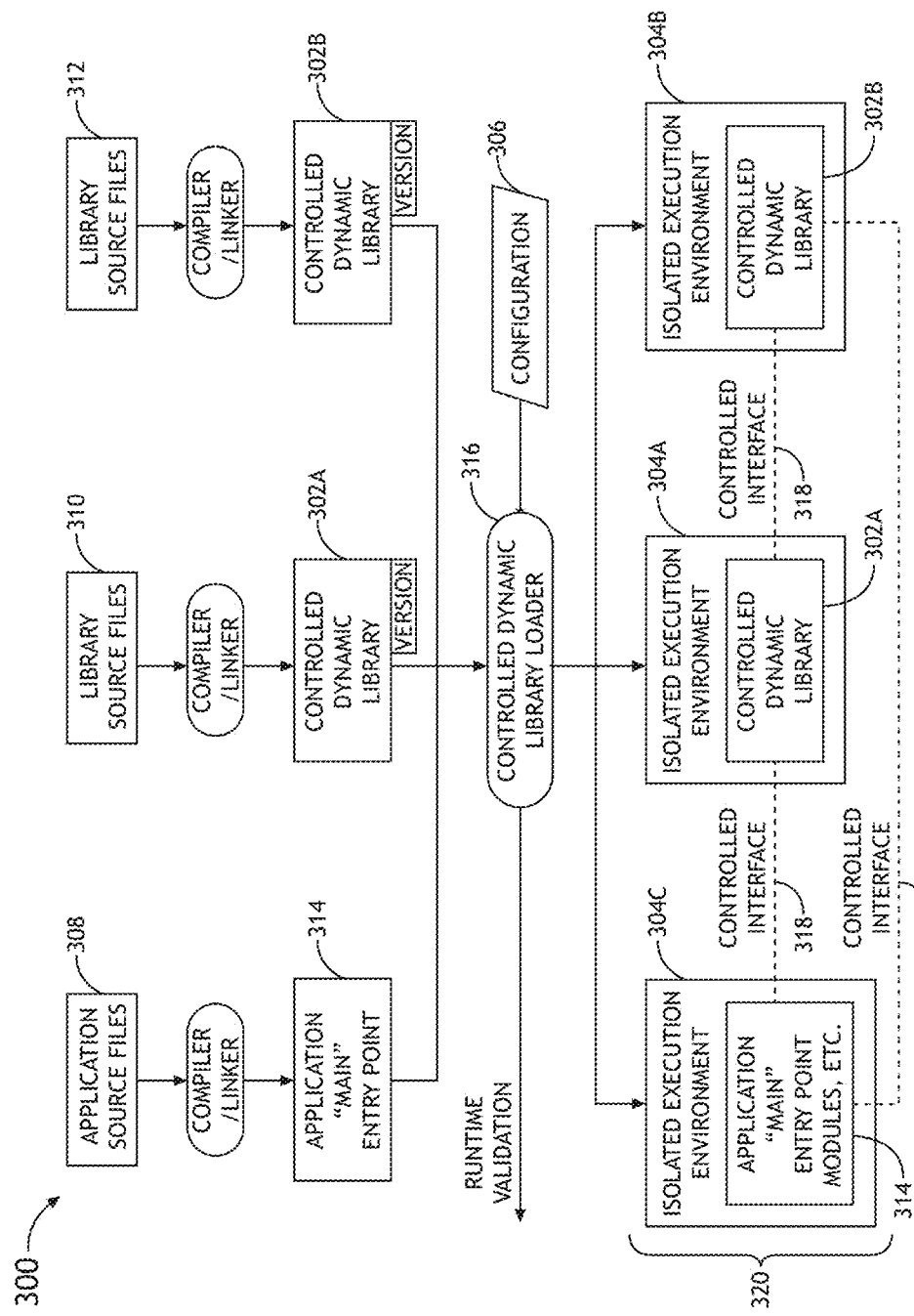
FIG. 3 is a block diagram depicting a system implementing controlled dynamic libraries and isolated execution spaces in accordance with embodiments of the inventive concepts disclosed herein.

Referring to FIG. 3, a block diagram depicting an embodiment of an operating system 300 implementing controlled dynamic libraries 302 and isolated execution spaces 304 is shown. It is noted that implementing the controlled dynamic libraries 302 and the isolated execution spaces 304 as depicted herein enables partitioning of functionality into separate components that can be explicitly linked together at runtime under the full control and visibility of an application developer (or a system integrator, or generally referred to as a user). In other words, implementing the controlled dynamic libraries 302 and the isolated execution spaces 304 as depicted herein effectively provides memory (or space) partitioning for the controlled dynamic libraries 302. The details of the controlled dynamic libraries 302 and the isolated execution spaces 304 are described as follows.

In some embodiments, a configuration file 306 (e.g., created by a user) may define how an application source file 308 should be loaded, including the number and order of any libraries that should be dynamically linked to form an executable application 320. For exemplary purposes, suppose the configuration file 306 specifies that a first library as defined in a first library source file 310 and a second library as defined in a second library source file 312 should be dynamically linked to the application source file 308. This configuration allows the application source file 308, the first library source file 310, and the second library source file 312 to be compiled independently without being statically linked together into a single executable.

A controlled dynamic library loader 316 may then be utilized to dynamically load the compiled application 314, the first compiled library (referred to as the first controlled dynamic library 302A), and the second compiled library (referred to as the second controlled dynamic library 302B) at runtime based on the definitions provided in the configuration file 306. It is contemplated that the controlled dynamic library loader 316 may be configured to load the first controlled dynamic library 302A and the second controlled dynamic library 302B only when the configuration file 306 is present. That is, configuration management may be limited to a per-application basis, which may help prevent unintended and/or unauthorized loading/changing of libraries.

It is contemplated that version identifiers may be utilized in some embodiments to verify whether dynamically linking a library to an application is permissible. In reference to the example depicted in FIG. 3, version identifiers may be embedded into the compiled application 314 and the controlled dynamic libraries 302A and 302B. These embedded version identifiers may be cross checked by the operating system 300 (or the controlled dynamic library loader 316) before dynamically linking the compiled application 314 with the controlled dynamic libraries 302A and 302B. In this manner, any version mismatches may be identified and/or reported prior to execution. Additionally and/or alternatively, the version identifiers embedded in the compiled application 314 and the controlled dynamic libraries 302A and 302B may also be verified at runtime after the load is complete. This allows runtime configurations to be further validated by additional components if/when necessary.

If no version mismatch is identified by the operating system 300 (or the controlled dynamic library loader 316), the controlled dynamic library loader 316 may load the compiled application 314 and the controlled dynamic libraries 302A and 302B separately into their corresponding isolated execution spaces 304. The isolated execution spaces 304 are utilized to isolate and contain the compiled application 314 and the controlled dynamic libraries 302A and 302B within their respective execution spaces. Utilizing the isolated execution spaces 304 in this manner effectively prevents any control or coupling issues (if they arise) from impacting other parts of the executable application 320.

More specifically, in some embodiments, a memory management unit (MMU) of the computer system running the operating system 300 may be used to establish boundaries around the controlled dynamic libraries 302A and 302B to prevent the controlled dynamic libraries 302A and 302B from modifying data that they are not authorized to do so, and likewise, to prevent other parts of the application 320 (including other libraries) from modifying data within the isolated execution spaces 304A and 304B that contains the controlled dynamic libraries 302A and 302B.

Figure 4:
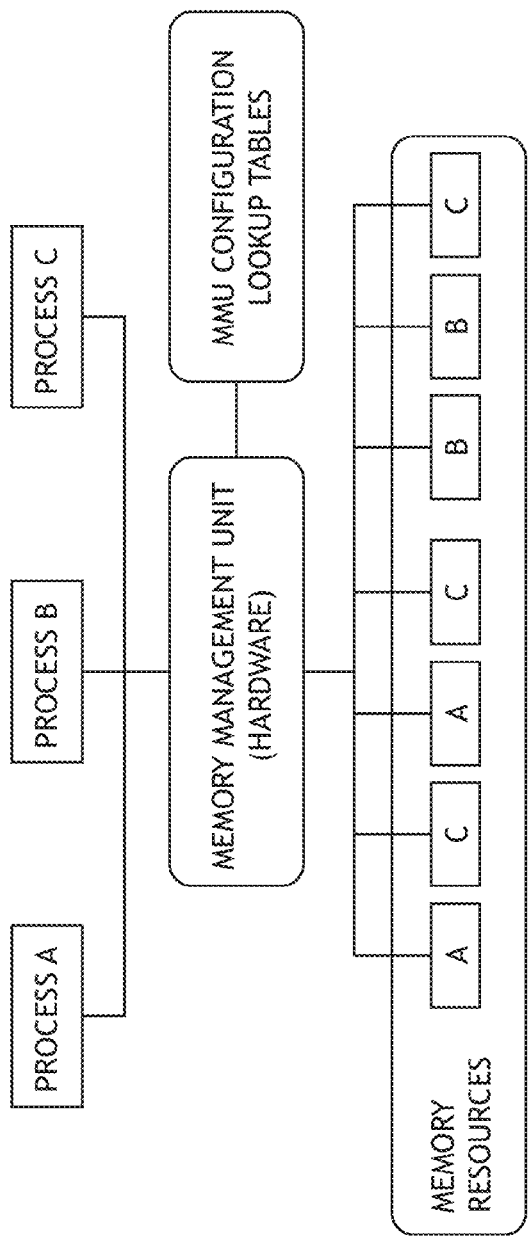
FIG. 4 is a block depicting a memory management unit without implementing isolated execution spaces.

A memory management unit (MMU) generally refers to a computer hardware unit utilized for managing memory resources. A MMU may be implemented as a part of the central processing unit (CPU), but it may also be implemented as a separate integrated circuit. In conventional operating systems, available memory resources are allocated to processes depending on the configuration mechanisms that are present in the operating system. As shown in FIG. 4, any software running within a process boundary has full access to any of the memory resources available to that process, including any statically or dynamically linked libraries. For example, any software running within Process A has full access to all memory resources available to Process A.

Figure 5:
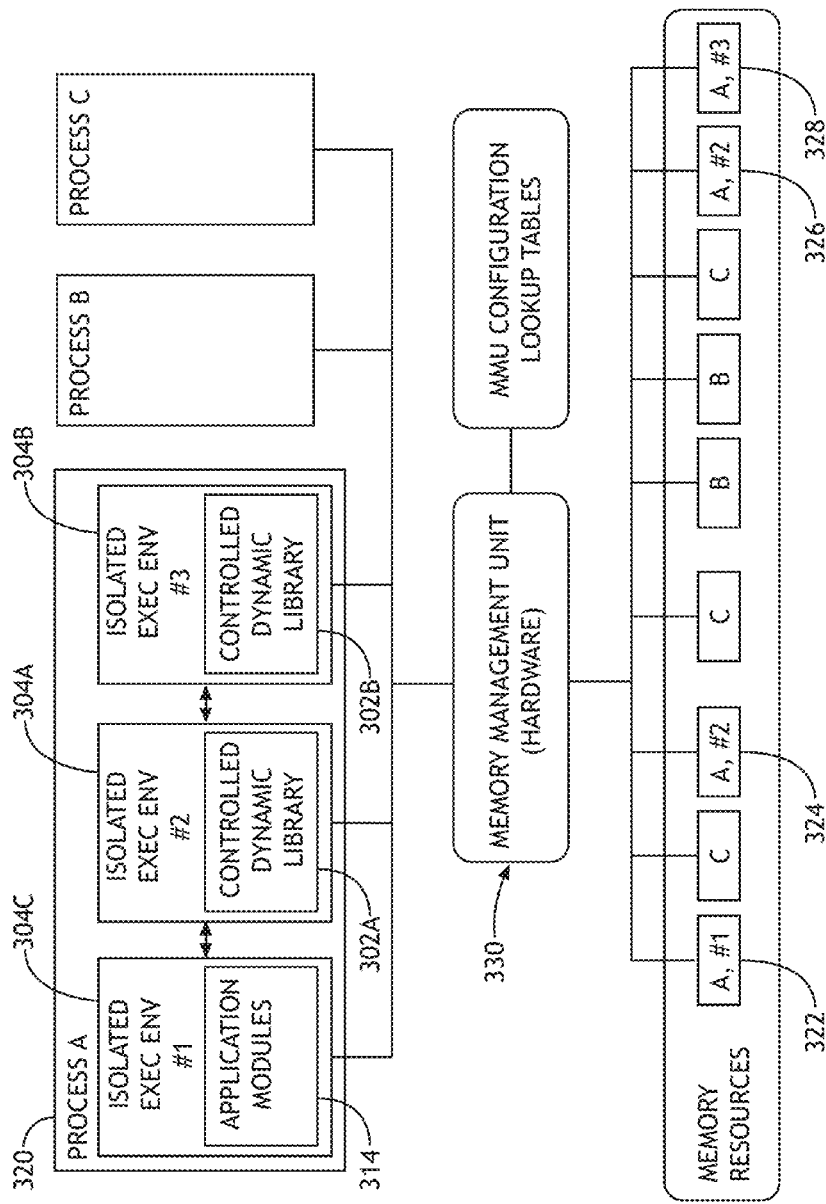
FIG. 5 is a block diagram depicting a memory management unit implementing isolated execution spaces in accordance with embodiments of the inventive concepts disclosed herein.

In contrast, the isolated execution spaces 304 implemented in embodiments in accordance with the inventive concepts disclosed herein create an additional layer of control within each process boundary. FIG. 5 is an illustration depicting this additional layer of control provided by the MMU 330. The dynamically linked application 320 previously depicted in FIG. 3 is represented as Process A 320. For illustrative purposes, suppose that multiple memory resources 322 through 328 are allocated to the Process A 320, and further suppose that among the memory resources 322 through 328, the memory resource 322 is allocated to the isolated execution space 304C, the memory resources 324 and 326 are allocated to the isolated execution space 304A, and the memory resource 328 is allocated to the isolated execution space 304B. The MMU 330 may then enforce this allocation so that the compiled application 314 contained in the isolated execution space 304C only has full access to the memory resource 322, but not to the memory resources 324, 326, and 328. Similarly, the controlled dynamic libraries 302A and 302B contained in the isolated execution spaces 304A and 304B may have full access only to their respective memory resources, effectively isolating the memory resources according to the boundaries of the isolated execution spaces 304.

To further enforce the isolation between the isolated execution spaces 304, communications between the compiled application 314 and the controlled dynamic libraries 302A and 302B may be permissible only through controlled interfaces 318 defined between them (as illustrated in FIG. 3). It is contemplated that the implementations of the controlled interfaces 318, together with memory resource isolation described above, effectively prohibit any unintended and/or unauthorized communications and/or interactions to occur between the compiled application 314 and the controlled dynamic libraries 302A and 302B.

Figure 6:
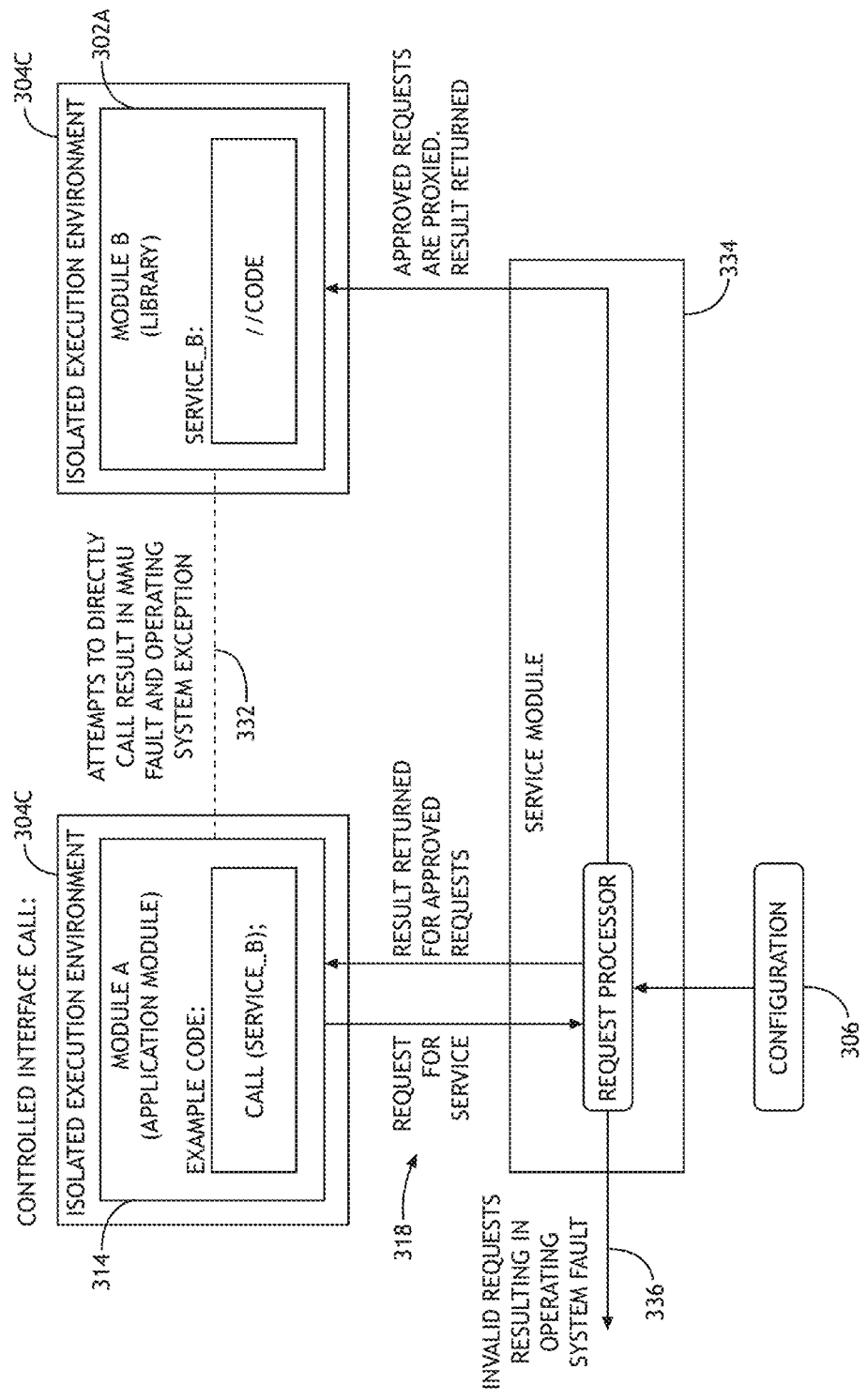
FIG. 6 is a block diagram depicting handling of a controlled interface call.

In some embodiments, communications between the compiled application 314 and one or more of its controlled dynamic libraries 302A and 302B may be carried out as function calls through the controlled interfaces 318. In some embodiments, a controlled interface 318 may function like a kernel trap or a system call. That is, an intentional violation of the controlled interface 318 may be used to trigger a kernel call or trap, which may trigger a simple context switch to facilitate communications between the compiled application 314 and one or more of its controlled dynamic libraries 302A and 302B. FIGS. 3 and 6 include illustrations depicting an exemplary process for handling a controlled interface call.

More specifically, suppose Module A (e.g., a compiled application 314) and Module B (e.g., a controlled dynamic library 302A) are both loaded into their corresponding isolated execution spaces 304C and 304A. Each isolated execution space 304 in turn runs in its own execution context. If the compiled application 314 needs to call a service defined in the controlled dynamic library 302A, a direct function call 332 from the compiled application 314 to the controlled dynamic library 302A may be used to intentionally violate the controlled interface 318, which may result in a MMU fault (due the memory resource isolation previously described), which in turn may prompt a context switch.

The context switch may be handled by an isolated execution space service module 334, which may be implemented as a component of the operating system 300. The context switch is needed in order to alter the execution context so that memory addresses that were accessible only to the isolated execution space 304C (which contains the caller, the compiled application 314) can be removed, and memory addresses that are accessible to the isolated execution space 304A (which contains the callee, the controlled dynamic library 302A) can be enabled. Upon completion of the context switch, execution is allowed to continue, but now only within the execution context of the isolated execution space 304A. In other words, any attempts by the isolated execution space 304A (and any modules it contains) to execute code or to read/write data beyond its execution context may result in a fault 336 delivered to the underlying operating system, which may then invoke any exception or fault-handling policies available to the operating system to handle the fault 336.

It is contemplated that the isolated execution space service module 334 may be configured to conduct additional checking and verification processes to further ensure the safety of the system. For example, parameters received at the request processor of the isolated execution space service module 334 may be monitored and checked for out of bounds values and to validate that coupling assumptions are not being violated. Additional validation processes may also be enabled if/when needed. For example, if an error has occurred, instrumentation code may be activated to intercept each controlled interface call going through the isolated execution space service module 334 to determine whether the parameters and control/data flows appear valid. Any invalid parameters or flows may prompt error messages and/or a fault 336.

Similarly, the isolated execution space service module 334 may be further configured to implement a flow control or rate limiting feature on the controlled interface calls. For instance, each controlled interface call going through the isolated execution space service module 334 may be subject to a flow control logic, which may enforce a certain expected behavior between the caller and the callee. This flow control logic may be used both in development to identify aberrant behavior in an application, or used as an extra safety measure in operation (e.g., during flight for an avionic system) to ensure that all aspects of the application are behaving deterministically.

The isolated execution space service module 334 may also be configured to monitor the controlled interface calls to obtain profiling information about how an application uses its controlled dynamic libraries, or how much time is spent in various parts of the application. Additionally, logging may be enabled at the isolated execution space service module 334, which may provide debug and tracing information if/when needed.

It is contemplated that in addition to context switching as described above, call stack switching may be implemented in some embodiments to further improve safety and security of the system 300. Implementing call stack switching may reduce interdependencies between the controlled dynamic libraries on each other's stack, which may in turn ease certification burdens for avionic systems.

Figure 7:
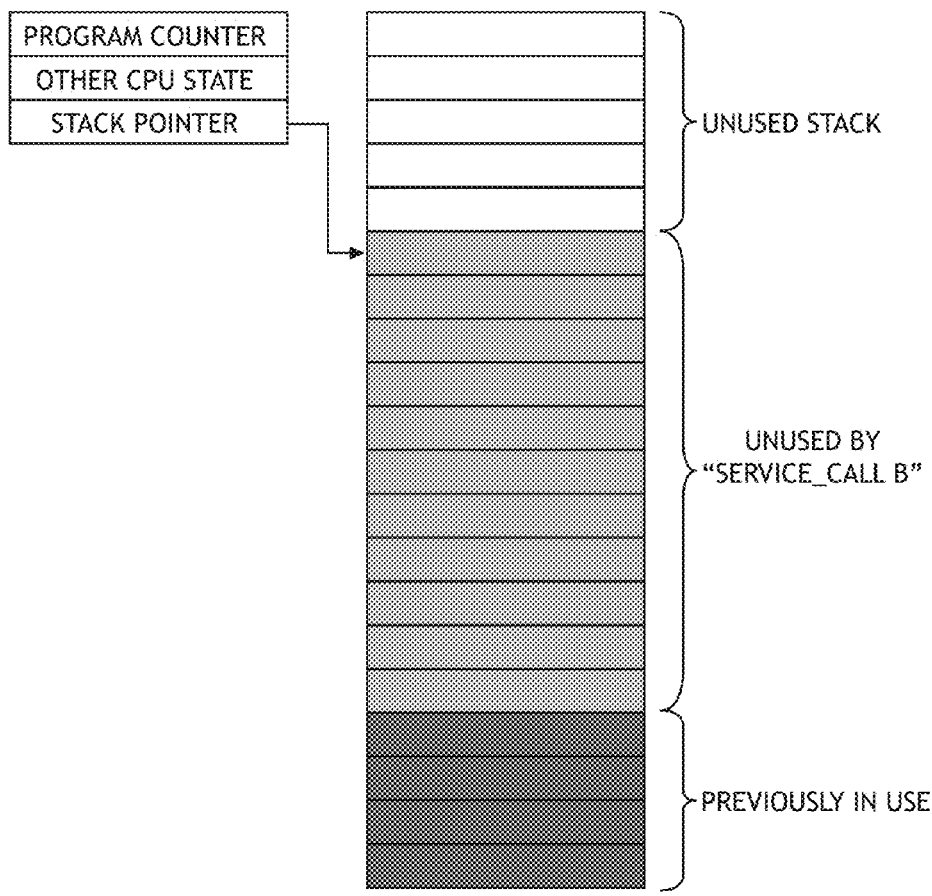
FIG. 7 is an illustration depicting a function call stack processing.
Figure 8:
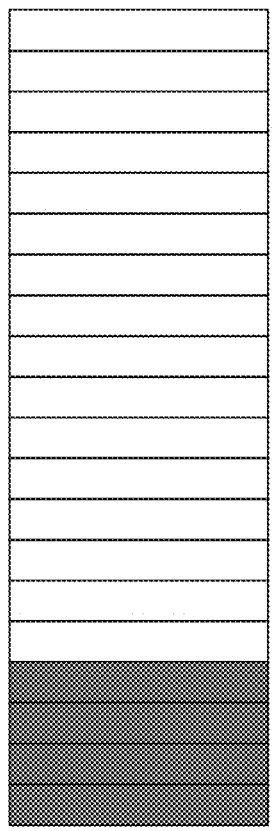
FIG. 8 is an illustration depicting a controlled interface call stack switch processing.
Figure 8:
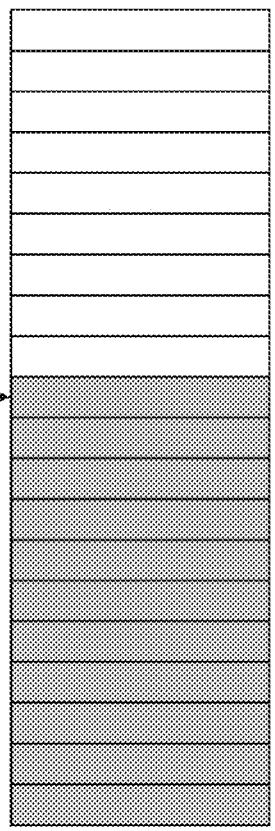

FIG. 7 is an illustration depicting a conventional function call stack processing. When the same stack is used by different modules, a caller has no control of how much stack will be consumed by a callee. If the callee consumes more stack than is available, undefined behaviors may occur. Therefore, rather than sharing the same stack between different modules, each module may manage its own stack as shown in FIG. 8. More specifically, continuing with the example depicted in FIGS. 3 and 6, the caller (e.g., the compiled application 314) may manage its own stack 340 while the callee (e.g., the controlled dynamic library 302A) may manage its own stack 342 independently. When the execution context is switched from the compiled application 314 to the controlled dynamic library 302A, a pointer may be switched from stack 340 to stack 342, and stack 342 may then be utilized as the active stack accordingly. It is contemplated that the reverse process may be utilized when the execution context is switched from the controlled dynamic library 302A to the compiled application 314.

It is also contemplated that implementing call stack switching as described above may help reduce certification burdens (e.g., for avionics) when a new version of a library is made available. More specifically, because the stacks are now decoupled, stack analysis required for certification purposes may only need to be performed independently on each module (e.g., the compiled application 314 and the controlled dynamic library 302A). On the other hand, without decoupling the stacks, a complex stack analysis of the combination of the compiled application 314 and the controlled dynamic library 302A is required. Furthermore, if the controlled dynamic library 302A were to be swapped out with a newer version, this complex stack analysis would then need to be repeated for the new combination again. Therefore, implementing call stack switching as described above may be beneficial for safety, security, as well as cost reduction reasons.

Figure 9:
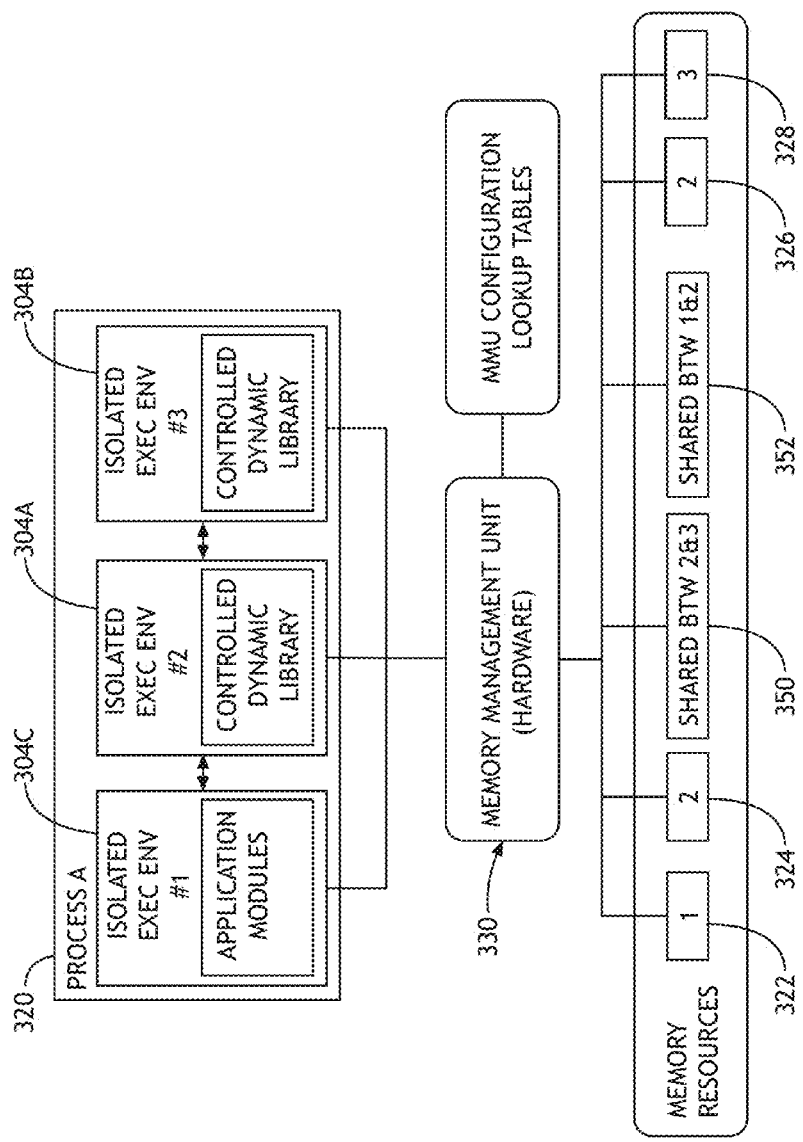
FIG. 9 is a block diagram depicting a memory management unit implementing isolated execution spaces and shared memory spaces.

Referring now to FIG. 9, an embodiment in accordance with the inventive concepts disclosed herein with support for shared memory regions 350 and 352 is shown. Similarly to the illustration depicted in FIG. 5, each of the isolated execution spaces 304A, 304B, and 304C may have full access to their respective memory resources 322 (for 304A), 324 and 326 (for 304B), and 328 (for 304C), but they may not access each other's memory resources directly. It is contemplated, however, that there may be situations where shared memory regions, such as memory regions 350 and 352, may be desirable for performance reasons. A shared memory region 350 and 352 may be created and made accessible to more than one of the isolated execution spaces 304. It is contemplated that the shared memory region 350 or 352 may be managed utilizing conventional memory management techniques. It is to be understood that while having a shared memory region 350 or 352 may lessen the level of isolation provided in comparison to the various embodiments previously described, a shared memory region 350 or 352 only opens a relatively small window for possible corruption to occur; the overall implementation still prevents the unbounded type of corruption that can normally occur in traditional applications.

It is contemplated that the various embodiments described above may be utilized to provide safe operating environments that would allow dynamically linked libraries to be used in a safety critical environment such as avionics. Providing abilities to dynamically load libraries may provide significant cost reduction by allowing applications to remain unchanged while swapping out underlying libraries. The following sections present several types of exemplary libraries that can benefit from the dynamic loading abilities described herein. It is to be understood, however, that the types of libraries that can be dynamically linked are not limited to the types presented in the following examples. The libraries that can be dynamically linked may include user-space drivers, user-space libraries, protected libraries, as well as other types of libraries without departing from the broad scope of the inventive concepts disclosed herein.

A user-space driver refers to a device driver that is implemented in an application space, typically as a library that can be linked to an application. The library code compiled into the application is able to then dereference a pointer in application space that is mapped directly to the underlying device memory or registers. For certain types of devices, using user-space drives can yield enormous performance improvements, as the device accesses are not subject to kernel traps and do not need to go through a device driver subsystem. However, traditional user-space drivers suffer from two problems. For instance, when a user-space driver is (statically) linked to an application, the application is then tied to a specific revision of the hardware (which is driven by the driver). If that hardware is updated, the application may need to be relinked or recompiled, which leads to increased costs (including certification costs in case of avionics). Another problem is that since libraries (static or dynamic) are typically linked with the application in the same address space, any error in the application or another library has the potential to corrupt the memory of the user-space driver, including memory mapped registers, which may lead to unpredictable operation of the hardware, and in the case of avionics, a catastrophic safety event.

Figure 10:
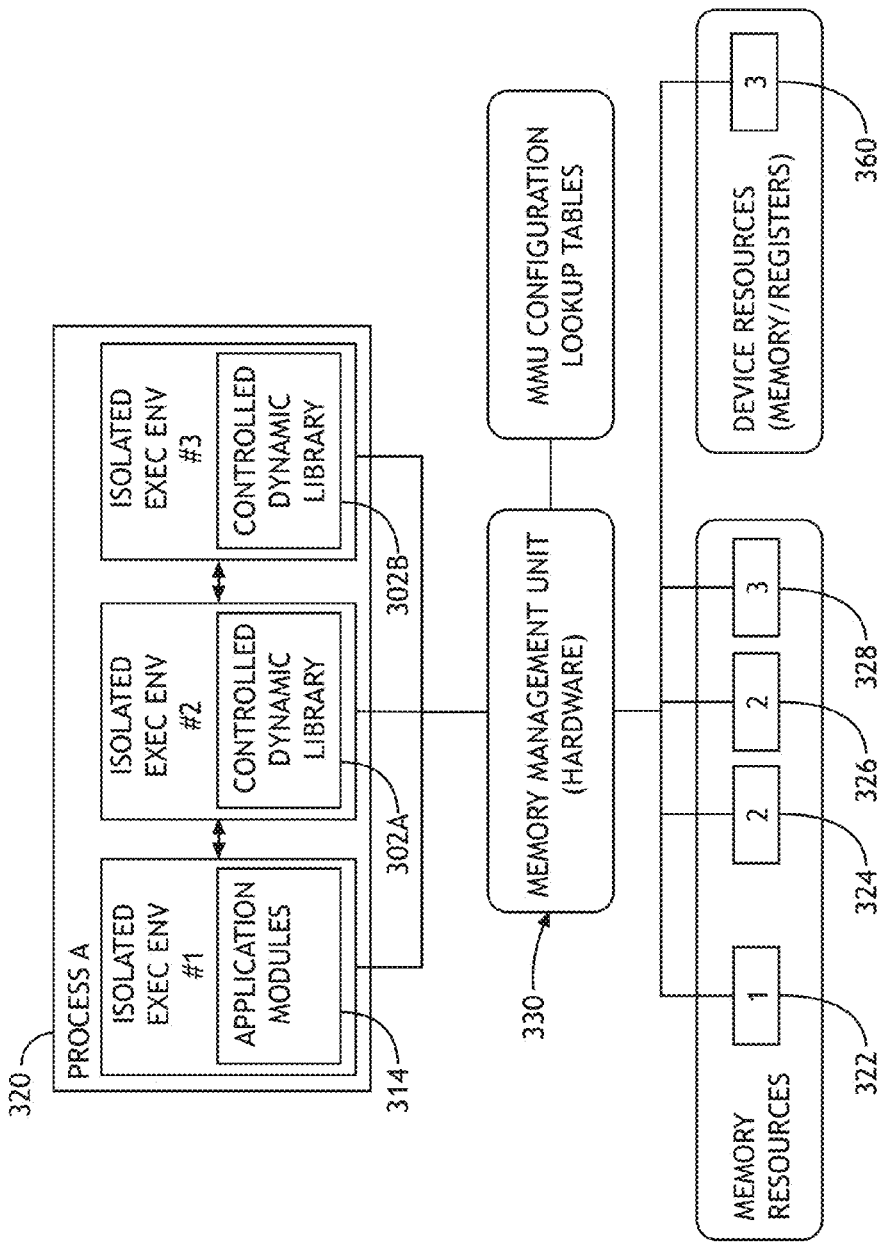
FIG. 10 is a block diagram depicting a memory management unit supporting a user-space driver.

Utilizing controlled dynamic libraries in accordance with the inventive concepts disclosed herein, a user-space driver may be loaded in a controlled manner and may not experience the problems described above. Referring generally to FIGS. 5 and 10. Suppose the controlled dynamic library 302B is a user-space driver, the MMU 330 may be configured so that only the user-space driver 302B has access to the memory mapped device registers and/or memory regions 360. In addition, the ability to dynamically load the user-space driver 302B frees the compiled application 314 from containing code that is hardware specific. If/when the hardware driven by the user-space driver 302B is updated, only the user-space driver 302B needs to be updated, and the user-space driver 302B may be updated without requiring the compiled application 314 to be relinked or recompiled.

Another added benefit provided by dynamically linking the user-space driver 302B to the compiled application 314 is that the separation between the user-space driver 302B and the compiled application 314 may allow the user-space driver 302B and the compiled application 314 to be certified separately. This may be beneficial for avionics and in other industries where certification of software is required. For instance, the user-space driver 302B may be certified to a particular Design Assurance Level (DAL) that may be different than the compiled application 314. Furthermore, dynamically linking the user-space driver 302B to the compiled application 314 may provide productivity benefits as well. For instance, the user-space driver 302B may be debugged with the same debugging tools used by the application developer. This has the potential to decrease root cause analysis time when device-related errors are experienced because all software in a call chain can be made fully visible (e.g., through the isolated execution space service module 334 as previously described), including input/output of the user-space driver 302B.

While the user-space driver 302B described above may be considered as particular type of user-space library, it is contemplated that other types of user-space libraries in general may also benefit from implementations of the controlled dynamic libraries in accordance with the inventive concepts disclosed herein. For example, as long as a change to a user-space library does not affect its controlled interfaces, a new version of the user-space library may be substituted without affecting the compiled application 314 itself. The implementations of the controlled dynamic libraries in accordance with the inventive concepts disclosed herein effectively provide the safety and isolation features necessary to update the libraries in a clean and safe manner.

In addition, the implementations of the controlled dynamic libraries in accordance with the inventive concepts disclosed herein also provide testing and monitoring capabilities, allowing the interactions between an application and its controlled dynamic libraries to be tested and monitored if/when needed. For instance, the various checking and verification processes carried out by the isolated execution space service module 334 (as previously described in FIG. 6) may be utilized to validate and control the parameters, data, and flow through the controlled interfaces. Also as previously described, memory space partitioning, version control, compatibility check, logging, debugging, as well as other error detection techniques may also be utilized to facilitate testing and monitoring of the integrated (i.e., dynamically linked) application 320.

Figure 11:
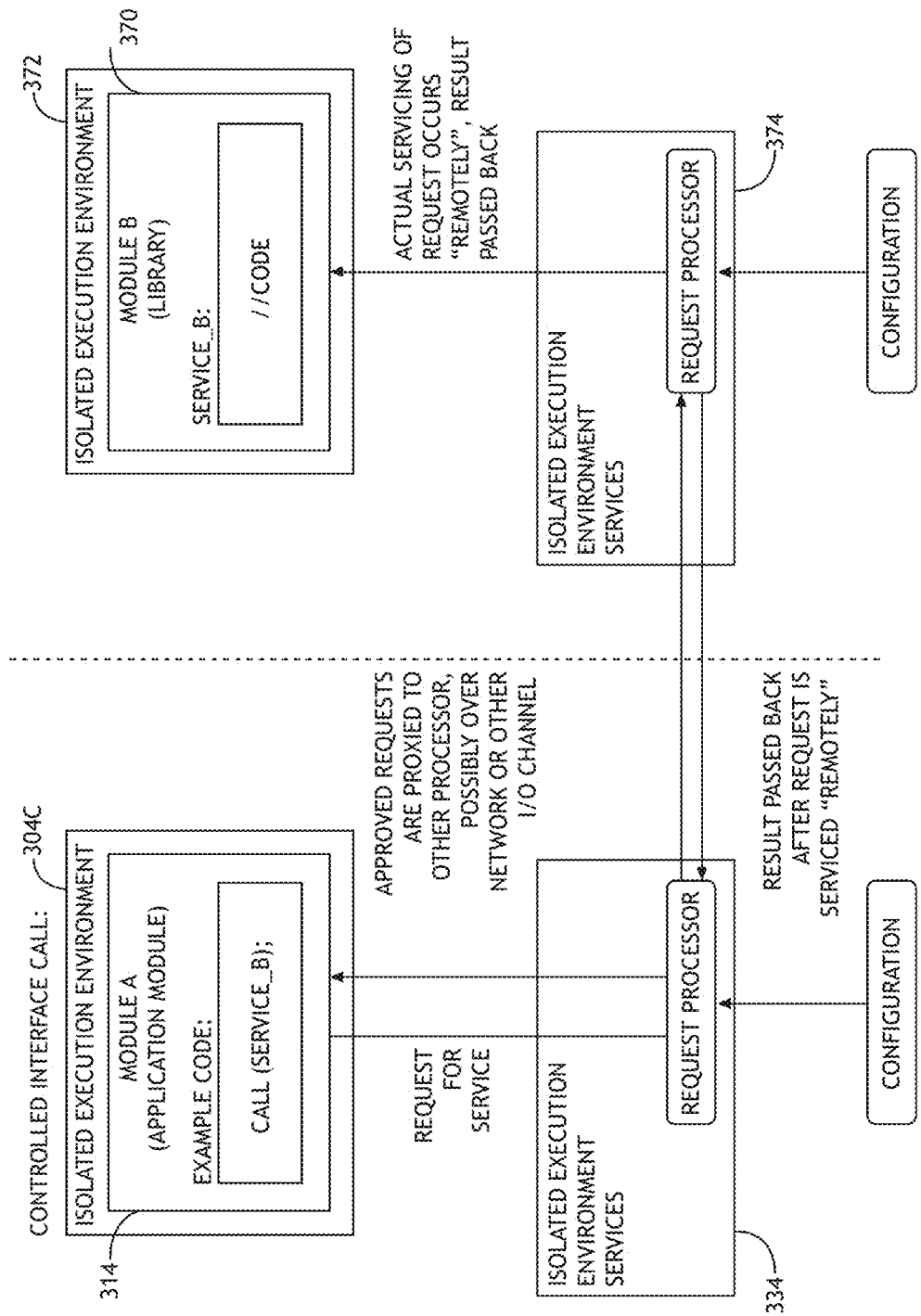
FIG. 11 is a block diagram depicting handling of a controlled interface call to a remote library.

It is contemplated that the implementations of the isolated execution spaces and the controlled interfaces in accordance with the inventive concepts disclosed herein may also facilitate implementations of remote executions in a clean and safe manner. Referring to FIG. 11, suppose a compiled application 314, is loaded into an isolated execution space 304C, and suppose also that the compiled application 314 should be dynamically linked to a library 370. Rather than loading the library 370 into an isolated execution space within the same operating system hosting the isolated execution space 304C, a "proxy" of the library 370 may be loaded instead, which may serve to remotely communicate with an actual version of the library 370 loaded into an isolated execution space 372 hosted elsewhere.

It is contemplated that the isolated execution space service modules 334 and 374 servicing the compiled application 314 and the library 370, respectively, may be utilized to facilitate the communication. Additionally and/or alternatively, the abilities to process remote executions may be utilized for testing purposes. For example, calls going through the isolated execution space service module 334 may be sent to the isolated execution space service module 374, which may be used to record the calls for debugging purposes at a later time or at a different location. It is contemplated that the isolated execution space service modules 334 and 374 may be hosted on different operating systems, processor architectures (e.g., ARM, x86, PowerPC or the like), or in physical locations over a network, without departing from the broad scope of the inventive concepts disclosed herein.

It is further contemplated that the implementations of the controlled dynamic libraries and the isolated execution spaces in accordance with the inventive concepts disclosed herein may simplify integration of applications and may support reuse of modular components. For example, in the aviation industry, standards such as Future Airborne Capability Environment (FACE) have been developed to provide guidelines for creating a common operating environment to support applications across multiple avionics systems. The FACE concept depends heavily on the idea of modular components reused across platforms along with isolation layers to aid in that reuse. The abilities to link dynamic libraries at runtime, as provided in the implementations of the controlled dynamic libraries and the isolated execution spaces in accordance with the inventive concepts disclosed herein, may be utilized to facilitate reuse of modular components across platforms.

In addition, a large number of components in a FACE system may be used for isolating interfaces to line-replaceable units (LRUs). An example is turning a global positioning system (GPS) data into latitude and longitude information needed by a flight management system (FMS). In a modular system where multiple components are being put together, implementing each LRU control element as a library may simplify integration and reduce the number of separate applications needed for different operation platforms.

Furthermore, while FACE components may have clearly documented input/output (I/O), there is no requirement for them to use the same I/O format. Data conversions may be utilized, but such processes are very complicated. The use of runtime dynamically linked libraries allows for a plug-in that can handle this conversion.

It is to be understood that the references to FACE, and to avionics in general, as described in the examples above, are merely exemplary. The controlled dynamic libraries and the isolated execution spaces in accordance with the inventive concepts disclosed herein may be implemented in various types of systems utilized for various types of purposes without departing from the broad scope of the inventive concepts disclosed herein.

Figure 12:
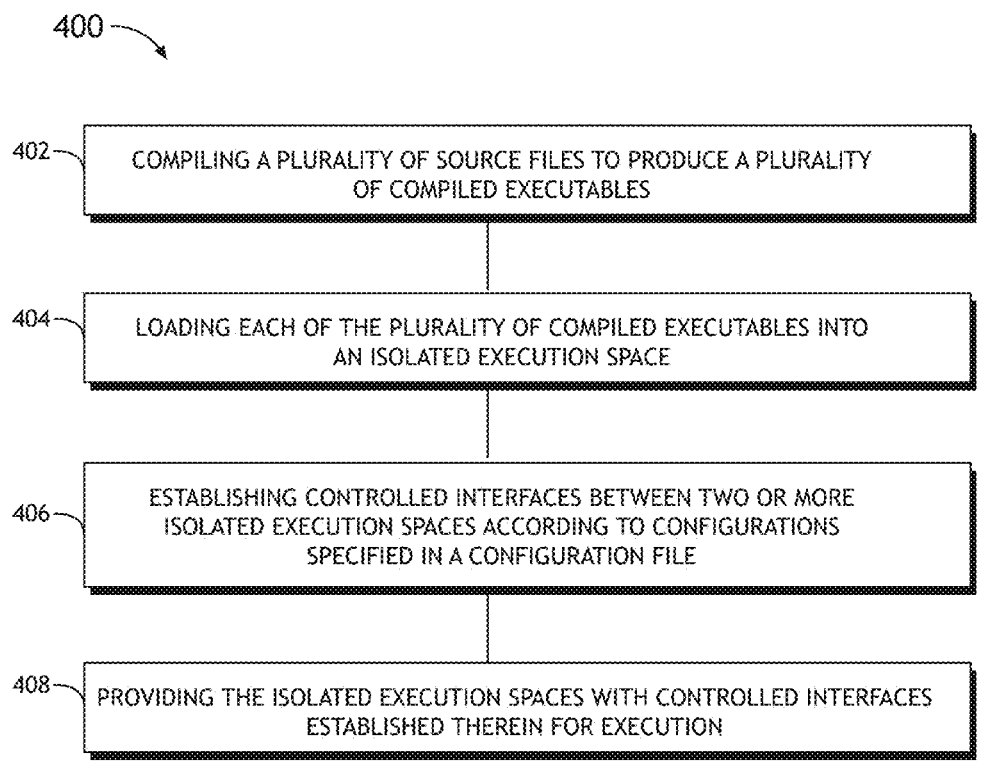
FIG. 12 is a flow diagram depicting an embodiment of a method for supporting dynamically linked libraries.

Referring now to FIG. 12, a flow diagram depicting an embodiment of a method 400 for supporting dynamically linked libraries is shown. A plurality of source files may be independently compiled in a step 402. The plurality of source files may include source files for one or more applications and/or libraries. Subsequently, one or more compiled applications and/or libraries may be loaded into their respective isolated execution space in a step 404, and controlled interfaces between the isolated execution spaces may be established in a step 406 according to configurations specified in a configuration file. The configuration file may specify, for example, which libraries should be loaded along with a particular application, how should the libraries and the particular application be linked, and if applicable, in which order.

As previously described, each isolated execution space contains a compiled executable (e.g., an application binary or a compiled library). Each isolated execution space effectively provides memory (or space) partitioning for the compiled executable contained therein. Communications between two isolated execution spaces are only permissible at runtime through a controlled interface established between them; and if there is no controlled interface established between them, they are not permitted to communicate with each other. As previously described, once the compiled executables are loaded and the controlled interfaces are established as specified in the configuration file, these compiled executables are considered dynamically linked and they jointly form an executable application ready for execution in a step 408.

It is contemplated that context switch as described above may be utilized to handle communications (e.g., function calls made through the controlled interface) between two isolated execution spaces. Utilizing the context switch techniques as described above helps maintaining isolation between the two isolated execution spaces while facilitating necessary linkage between them. It is also contemplated that call stack switch as described above may be utilized as well to further reduce interdependencies between the isolated execution spaces.

Furthermore, it is contemplated that error detections and verification processes may be carried out at various steps within method 400. For instance, version checking may be performed prior to the loading step 404 and again at runtime in the execution step 408. It is contemplated that the other types of error detection and verification processes described above may also be carried out at various steps within method 400 without departing from the broad scope of the inventive concepts disclosed herein.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising: loading a plurality of binary files of an executable application into a plurality of isolated execution spaces defined on a computing system according to a loading order specified in a configuration file;
    establishing controlled interfaces between at least two of the plurality of isolated execution spaces loaded with at least two of the plurality of binary files of the executable application according to configurations specified in the configuration file, wherein the controlled interfaces are configured to prohibit unauthorized communications between the plurality of isolated execution spaces, and wherein a controlled interface call through one of the controlled interfaces from a first isolated execution space to a second isolated execution of the plurality of isolated execution spaces invokes a context switch of an execution context to securely maintain isolation between the first isolated execution space and the second isolated execution space;
    and forming the executable application for execution on the computing system, the executable application being formed by linking the plurality of binary files from the plurality of isolated execution spaces through the controlled interfaces established therein.

2. The method of claim 1, wherein each one of the plurality of binary files includes an embedded version identifier, and wherein the plurality of binary files are checked for compatibility prior to loading the plurality of binary files into the plurality of isolated execution spaces.

3. The method of claim 1, wherein said loading the plurality of binary files is permissible only when the configuration file is present, and wherein each one of the plurality of binary files is loaded into a corresponding one of the plurality of isolated execution spaces.

4. The method of claim 1, wherein each one of the plurality of isolated execution spaces is provided full memory access to an allocated memory portion.

5. The method of claim 1, wherein memory addresses allocated to the first isolated execution space are removed from the execution context.

6. The method of claim 1, wherein each of the plurality of isolated execution spaces maintains a separate call stack, and wherein a controlled interface call through one of the controlled interfaces from a first isolated execution space to a second isolated execution space of the plurality of isolated execution spaces invokes a call stack switch from a first call stack of the first isolated execution space to a second call stack of the second isolated execution space.

7. The method of claim 1, further comprising: validating each controlled interface call through the controlled interfaces, wherein at least one of a parameter, data, and a control flow of each controlled interface call is checked for validity.

8. The method of claim 1, further comprising: logging at least one of a parameter and data of a controlled interface call through the controlled interfaces.

9. A method, comprising: compiling a plurality of source files of an executable application to produce a plurality of compiled files of the executable application, each of the plurality of source files defining a component of the executable application;
    loading the plurality of compiled files of the executable application into a plurality of isolated execution spaces defined on a computing system according to a loading order specified in a configuration file;
    establishing controlled interfaces between at least two of the plurality of isolated execution spaces loaded with at least two of the plurality of compiled files of the executable application according to configurations specified in the configuration file, wherein the controlled interfaces are configured to prohibit unauthorized communications between the plurality of isolated execution spaces, and wherein a controlled interface call through one of the controlled interfaces from a first isolated execution space to a second isolated execution space of the plurality of isolated execution spaces invokes a context switch of an execution context to securely maintain isolation between the first isolated execution space and the second isolated execution space;
    and forming the executable application for execution on the computing system, the executable application being formed by linking the plurality of compiled files from the plurality of isolated execution spaces through the controlled interfaces established therein.

10. The method of claim 9, wherein each one of the plurality of compiled files includes an embedded version identifier, and wherein the plurality of compiled files are checked for compatibility prior to loading the plurality of compiled files into the plurality of isolated execution spaces.

11. The method of claim 9, wherein said loading the plurality of compiled files is permissible only when the configuration file is present, and wherein each one of the plurality of compiled files is loaded into a corresponding one of the plurality of isolated execution spaces.

12. The method of claim 9, wherein each one of the plurality of isolated execution spaces is provided full memory access to an allocated memory portion.

13. The method of claim 9, wherein the controlled interfaces are configured to prohibit unauthorized communications between the plurality of isolated execution spaces, and wherein a controlled interface call through one of the controlled interfaces from a first isolated execution space to a second isolated execution space of the plurality of isolated execution spaces invokes a context switch of an execution context.

14. The method of claim 13, wherein memory addresses allocated to the first isolated execution space are removed from the execution context.

15. The method of claim 9, wherein each of the plurality of isolated execution spaces maintains a separate call stack, and wherein a controlled interface call through one of the controlled interfaces from a first isolated execution space to a second isolated execution space of the plurality of isolated execution spaces invokes a first call stack switch from a call stack of the first isolated execution space to a second call stack of the second isolated execution space.

16. The method of claim 9, further comprising: validating each controlled interface call through the controlled interfaces, wherein at least one of a parameter, data, and a control flow of each controlled interface call is checked for validity.

17. The method of claim 9, further comprising: logging at least one of a parameter and data of a controlled interface call through the controlled interfaces.

18. A computer system, comprising: a memory; a memory management unit configure to mange allocation of the memory; and a processor configured to: provide a plurality of isolated execution spaces defined according to an operating system executing on the processor; load a plurality of binary files of an executable application into the plurality of isolated execution spaces according to a loading order specified in a configuration file, wherein each one of the plurality of binary files is loaded into a corresponding one of the plurality of isolated execution spaces, wherein each one of the plurality of isolated execution spaces is provided full memory access to an allocated memory portion, and wherein the memory management unit is utilized to prevent a particular isolated execution space of the plurality of isolated execution spaces from accessing the allocated memory portion of another isolated execution space of the plurality of isolated execution spaces;
- establish controlled interfaces among the plurality of isolated execution spaces loaded with at least two of the plurality of binary files of the executable application according to configurations specified in the configuration file,
- wherein the controlled interfaces are configured to prohibit unauthorized communications between the plurality of isolated execution spaces, and wherein a controlled interface call through one of the controlled interfaces from a first isolated execution space to a second isolated execution space of the plurality of isolated execution spaces invokes a context switch of an execution context to securely maintain isolation between the first isolated execution space and the second isolated execution space,
- wherein communications between the plurality of isolated execution spaces are permissible only through the controlled interfaces established among the plurality of isolated execution spaces; and form the executable application for execution on the computer system, the executable application being formed by linking the plurality of binary files from the plurality of isolated execution spaces through the controlled interfaces established therein.

19. The computer system of claim 18, wherein the controlled interfaces are configured to prohibit unauthorized communications between the plurality of isolated execution spaces, wherein a controlled interface call through one of the controlled interfaces from a first isolated execution space to a second isolated execution space of the plurality of isolated execution spaces invokes a context switch of an execution context, and wherein memory addresses allocated to the first isolated execution space are removed from the execution context as a result of the context switch.

\* \* \* \* \*